United States Patent [19]

Ohta et al.

[11] Patent Number: 4,642,700

[45] Date of Patent: Feb. 10, 1987

[54] METHOD OF AND APPARATUS FOR PRODUCING VIDEO SIGNAL ASSOCIATED WITH PHOTOGRAPHIC IMAGE

[75] Inventors: Takahiro Ohta; Masafumi Inuiya, both of Kaisei; Kazuyoshi Kobayashi, Chofu; Takashi Murakami, Omiya, all of Japan

[73] Assignee: Fuji Photo Film Co., Ltd., Kanagawa, Japan

[21] Appl. No.: 686,906

[22] Filed: Dec. 27, 1984

[30] Foreign Application Priority Data

Dec. 30, 1983 [JP] Japan ............................... 58-248081

[51] Int. Cl.$^4$ .............................................. H04N 1/04
[52] U.S. Cl. .................................... 358/285; 358/287; 358/293; 358/214; 358/54; 250/557; 250/234; 250/236
[58] Field of Search ............... 358/280, 285, 287, 293, 358/294, 214, 54, 335, 345, 348; 382/45, 46, 47; 352/242, 243, 244; 250/557, 234, 236

[56] References Cited

U.S. PATENT DOCUMENTS

| 4,288,818 | 9/1981 | Poetsch ............................ 358/214 |
| 4,312,017 | 1/1982 | Poetsch ............................ 358/214 |
| 4,418,360 | 11/1983 | Glasgow ............................ 358/214 |
| 4,513,324 | 4/1985 | Poetsch et al. ................... 355/214 |

Primary Examiner—James J. Groody
Assistant Examiner—Edward L. Coles
Attorney, Agent, or Firm—Birch, Stewart, Kolasch & Birch

[57] ABSTRACT

Video signals representative of photographic images which are stored in a plurality of substantially equally dimensioned frames in horizontal and vertical positions are produced by picking up the images. A first signal indicative of a horizontal/vertical position and a top-bottom orientation of the photographic image stored in any of the frames is entered. The photographic image is rotated relatively in response to the first signal. For a vertically positioned image, a video signal is produced which is representative of the image with a magnification which is smaller than that of a horizontally positioned image. Such a procedure provides a video signal which represents an image in a non-inverted top-bottom orientation without any essential portions of the image being omitted.

26 Claims, 22 Drawing Figures

METHOD OF AND APPARATUS FOR PRODUCING VIDEO SIGNAL ASSOCIATED WITH PHOTOGRAPHIC IMAGE

BACKGROUND OF THE INVENTION

1. Field of the Invention

The present invention relates to a method of and apparatus for producing video signals associated with photographic images and, more particularly, to a method of and apparatus for producing video signals in a television signal format, for example, by picking up frames which store photographic images therein.

2. Description of the Prior Art

There has been known an apparatus which picks up a photographic image using an image pickup device which transforms it into a raster-scan type video signal such as television (TV) signal. The photographic image may be any of those stored in the frames of a negative or positive film, which may be colored or monochromatic, and those of prints, which may also be colored or monochromatic.

The video signal produced by the apparatus may be displayed in the form of a visual picture, or soft copy, on a video monitor or like video display. If desired, it may be stored in a storage medium such as a magnetic disc, a magnetic tape, or an optical disc. The stored video signal is open to various manners of later use, as typified by producing a soft copy thereof on a video monitor or a hard copy on a paper sheet.

Films storing photographic images and applicable to a video signal producing apparatus of the type described include a roll of lone film and a circular disc of film. The roll type film is marketed in various standards, such as full and half sizes of JIS (Japanese Industrial Standard) 135 type films and 110 type films, each having specific frames recordable with a length-to-width dimensional ratio particular thereto. That is, the size of a frame differs from one type of film to another over a wide range. In the case of printed pictures, or prints, they may be accommodated in a single elongated carrier so as to be supplied to the apparatus as a so-called print album. Besides such a continuous supply mode, prints may be supplied in a discrete, frame-by-frame mode.

In any case, a picture or image of the kind described may be displayed on a video display such as a TV picture for viewing. A problem encountered here is due to the fact that an ordinary TV receiver or a like video display which is generally usable as a monitor has a screen which is longer horizontally than vertically. Specifically, the standard screen of such a display has a horizontal-to-vertical dimensional ratio of 4:3, whereas the size of a photographic picture differs over a wide range and, in addition, images in some frames may be oriented vertically and those in some other frames horizontally, depending upon the selected position of a camera at the time of shooting. Furthermore, with the 135 type, full size frames, for example, images may sometimes be exposed in one top-bottom orientation and sometimes in the other top-bottom orientation with respect to the lengthwise direction of the film, although all of them may be in vertical positions. Likewise, even horizontally positioned frames may differ in top-bottom orientation depending upon the kind of a camera used. Despite the variety of sizes and orientation situations, the pictures should always be displayed on the horizontally long screen of the display in a correct top-bottom orientation and in adequate dimensions without loosing essential portions thereof.

Many photographic images applicable to a video signal producing apparatus of the type concerned are recorded under various shooting conditions. In particular, shooting conditions under which negatives are exposed by amateurs vary considerably from film to film or even frame to frame. It is desirable that video signals with optical density (gradation) and colors of an image be converted to standard or substantially standard density and color even when such films were exposed to to widely scattering conditions.

When a video signal with converted density and colors is reproduced on a video monitor, the picture will appear almost natural to the eyes or with a special effect approximate to the one which was intended by the cameraman. If the video signals undergoing such conversion are stored in a storage medium and the medium is supplied to a user, it is possible for the user to reproduce a picture thereof with the appearance of substantially natural conditions or specific intended conditions.

SUMMARY OF THE INVENTION

It is therefore an object of the present invention to provide a method of and apparatus for producing a video signal from a photographic image which allows a picture to be always adequately displayed on a horizontally long screen of a video display.

In accordance with one aspect of the present invention, there is provided a method for producing video signals representative of photographic images which are stored in a plurality of substantially equally dimensioned frames in horizontal and vertical positions by picking up the images. The method comprises the steps of providing a first signal indicative of horizontal and vertical positions, and a top-bottom orientation of the photographic images stored in the frames, rotating the photographic image relatively in response to the first signal, and producing, for a vertically positioned image, a video signal representative of the image, with a magnification which is smaller than that of a horizontally positioned image, whereby the video signal represents the photographic image in a non-inverted, top-bottom orientation without any essential portions of the image being omitted.

In accordance with another aspect of the present invention, there is provided an apparatus for producing a video signal representative of a photographic image having an image pickup device for picking up photographic images which are stored in a plurality of substantially equally dimensioned frames in horizontal and vertical positions to form video signals representative of the photographic images, and output means for producing the video signals. The apparatus comprises input means for receiving a first signal indicative of vertical, horizontal, and top-bottom orientations of the photographic image stored in the frames, image rotating means for rotating the photographic image relatively in response to the first signal, and magnification varying means for producing, for a vertically positioned image, the video signal representative of the image with a magnification which is smaller than that of a horizontally positioned image, whereby the video signal represents the photographic image in a non-inverted, top-bottom orientation without essential portions of the image being omitted.

BRIEF DESCRIPTION OF THE DRAWINGS

The objects and features of the present invention will become apparent from a consideration of the following detailed description taken in conjunction with the accompanying drawings in which.

DESCRIPTION OF THE PREFERRED EMBODIMENTS

Referring to FIGS. 1A–1D of the drawings, a dotted line 10 represents an effective picture area of a video display in which a video signal representative of a picture in a standard TV signal format is reproducible. The standard vertical-to-horizontal dimensional ratio of the effective picture area is 3:4. Solid lines 12a, 12b, 12c and 12d each show exposed frames of a film which, in this example, is assumed to be a JIS 135 type, full-size film, the vertical-to-horizontal ratio of each frame being 2:3.

Figure 1A:
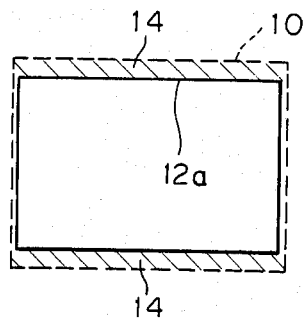
FIGS. 1A–1D are schematic diagrams useful for understanding the principles of the present invention.

In FIG. 1A, the horizontal width of the frame 12a which is horizontally positioned is substantially equal to that of the effective picture area 10 and the frame 12a is entirely included within the area 10. Only narrow regions 14 indicated by leftwardly upward hatching remain blank with no video information appearing therein.

Figure 1B:
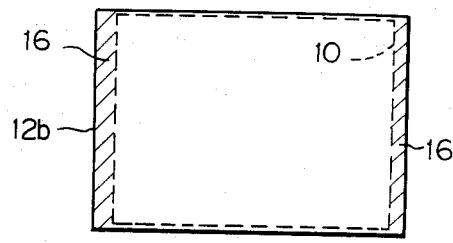

In FIG. 1B, the height of the frame 12b which is in a horizontal position is substantially equal to that of the effective picture area 10, so that those narrow portions 16 of the picture which are indicated by rightwardly upward hatching are omitted without being displayed. Nevertheless, since the finder of a camera has a field which is usually designed with a substantial margin for safety purpose, it is improbable that such an amount of omission would lead to loss of an essential part of the picture. Assuming that the magnification of the image in FIG. 1A is "1", the magnification in FIG. 1B is about 1.14 times that of FIG. 1A.

Figure 1C:
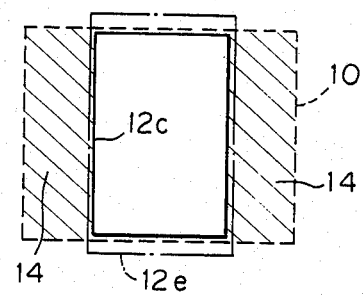
Figure 1D:
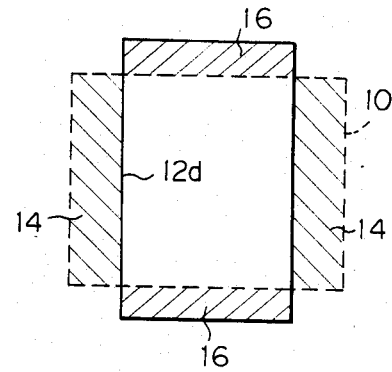

In FIG. 1C, the height of the frame 12c which is vertically positioned is substantially equal to that of the effective picture area 10, the whole frame 22c being included in the area 10. Therefore, the regions 14 of the area 10 indicated by leftwardly upward hatching remain blank; the total area of the regions 14 is 50% of the area 10. The magnification in FIG. 1C is about 0.74 times that of FIG. 1A.

Where the vertical frame 12d is displayed with the same magnification as that of FIG. 1A, as shown in FIG. 1D, those portions 16 of the frame 12d indicated by rightwardly upward hatching are omitted while the regions 14 of the effective picture area 10 indicated by leftwardly upward hatching remain blank. The omitted area of the frame 12d amounts to about 25% of the total frame area, and the blank region 14 is about 33% of the area 10. The result is the omission of about one fourth of the total video information which is carried by the picture and loosing such a substantial proportion of the essential video information, which is of course undesirable.

In accordance with the present invention, a horizontal picture is converted into a video signal as shown in FIG. 1A or 1B. A vertical picture, on the other hand, is processed as indicated by the solid line 12c in FIG. 1C or similarly thereto as indicated by a dash-and-dot line 12e, i.e., a condition which allows little of the essential portion of the picture to be lost. A vertical picture is, therefore, picked up in a magnification smaller than that of a horizontal picture. it will thus be understood that the ratio of the area of the omitted regions 16 to the total area of the frame 12 should acceptably be about 25% or less, preferably about 20% or less, and optimally substantially 0%.

Figure 2:
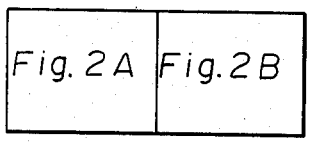
FIGS. 2A and 2B, when combined as shown in FIG. 2, are partial schematic block diagrams of a video signal producing apparatus embodying the present invention.
Figure 2A:
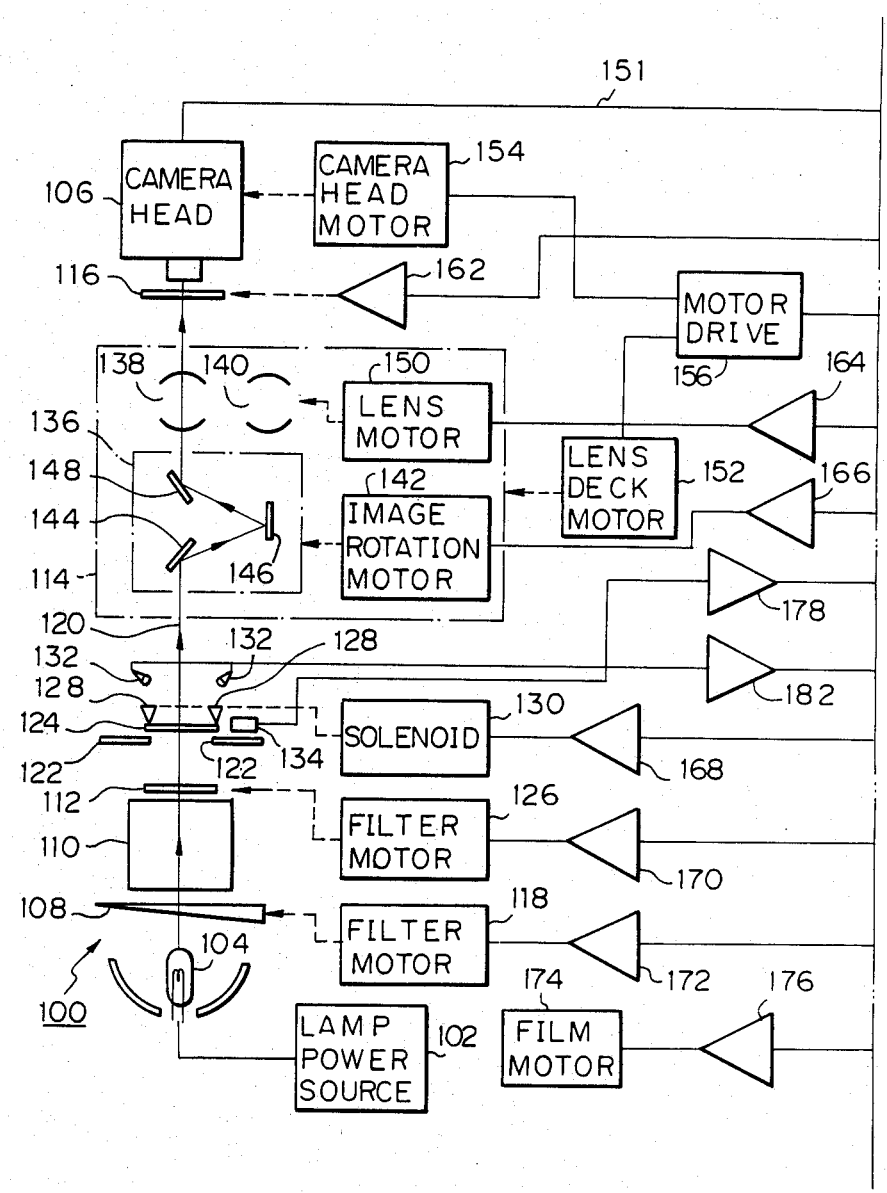
Figure 2B:
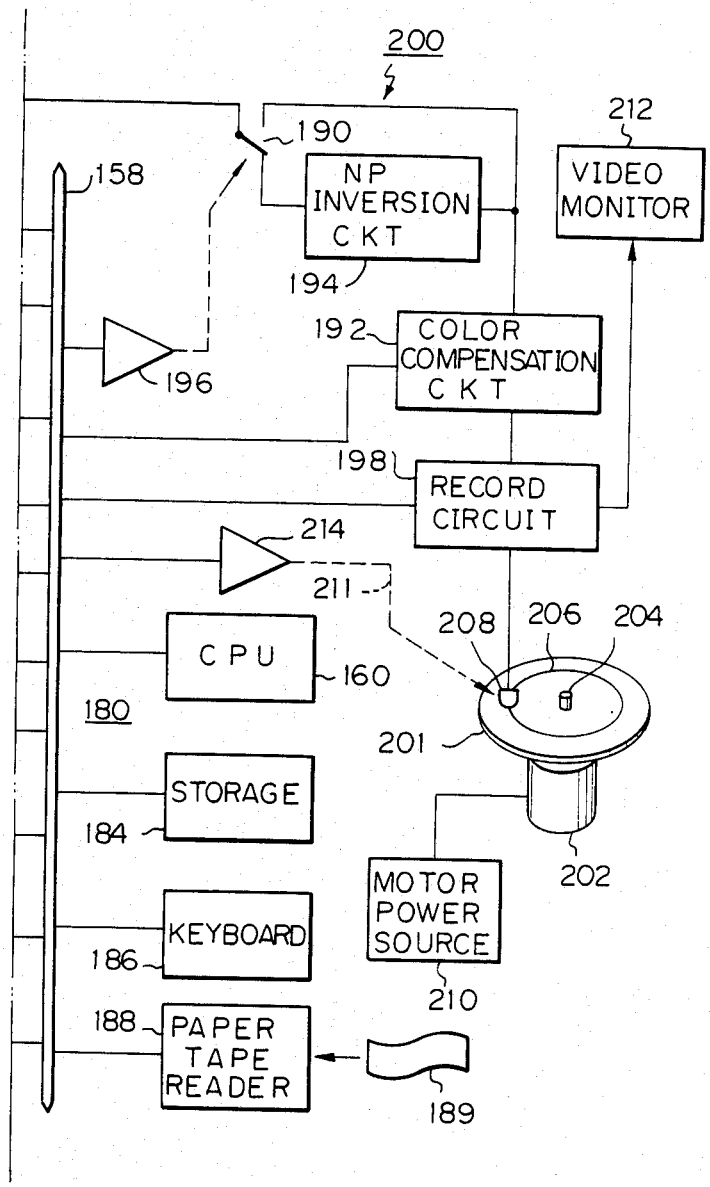

Referring to FIGS. 2A and 2B, the apparatus of the present invention includes an optical system, generally indicated by reference numeral 100, which extends from a light source 104 driven by a lamp power source 102 to a video camera head 106. Arranged sequentially on the optical axis 120 are an ND filter 108, a light integrator 110, a color compensation filter 112, a lens deck 114 and an optical shutter 116.

The ND filter 108 is an optical wedge filter whose optical density steplessly changes and is driven by a filter motor 118 in a plane perpendicular to the optical axis 120 to move into and out of the optical axis 120, thereby changing the illumination of light passing therethrough. The filter 112, on the other hand, serves as a color compensation filter for removing orange color when a negative film applied with an orange mask is used with the apparatus, as will be described. When required, the filter 112 is driven by a filter motor 126 into the optical axis 120 in a plane perpendicular to the optical axis 120.

A visual-image recording material 124, such as film or print, supported by a carrier 122 is located in a predetermined position between the filter 112 and the lens deck 114 as illustrated, so that any desired frame of the recorded material 124 may be illuminated by an illumination system. The recorded material 124 may be film supplied in any desired configuration such as in a roll or a disc. Negative roll type film or positive roll type film may be used, whether it be color or monochromatic, in any possible standard such as the JIS 135 type full- or half-size, or the 110 type. If recording material 124 comprises a transparent type film, the illuminatin system is arranged to that the illuminating rays emitted therefrom pass the film into the lens deck 114. If a print is used as the recording material 124, then the illumination system is so disposed as to direct the rays emanating therefrom to the print, with the reflected rays passing into the lens deck 114.

The frame of the image-carrying material 124, to be picked up, is fixed in place in a predetermined pickup station by pressing members 128, which are actuated by a solenoid 130. A photometric element 132 is responsive to the illumination of the frame.

Figure 5:
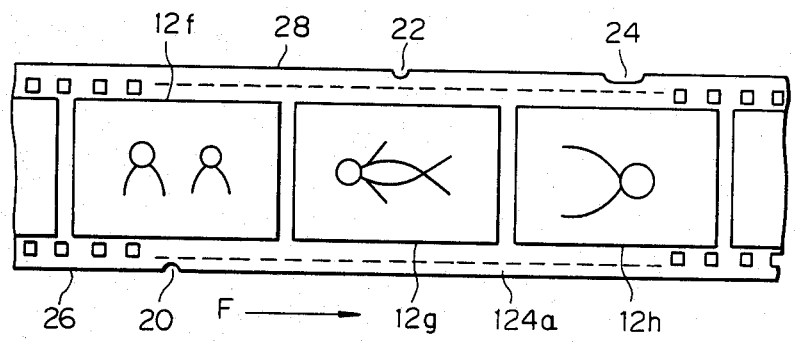
FIGS. 5 and 6 are plan views showing exemplary forms of photographic images which are applicable to the apparatus of the present invention.

As shown in FIG. 5, the film 124a used as an image-carrying material 124 in the illustrative embodiment may comprise a 135 type film which was exposed in a full-size. In FIG. 5, the film 124a is formed with notches 20, 22, 24 and so on at opposite edges 26 and 28 thereof. Specifically, a notch 20 having a predetermined shape is formed at one edge 26 of the film 124a in alignment with a frame 12f which was exposed horizontally in a given top-bottom orientation with respect to a predetermined longitudinal direction, e.g. a direction indicated by an arrow F. A notch 22 having another shape is formed at the other edge 28 in alignment with a frame 12g which was exposed in a vertical position in a given top-bottom orientation, and a notch 24 different in shape from the notch 22 is formed at the edge 28 in alignment with a frame 12h which was exposed in a vertical position but in the opposite top-bottom orientation to the frame 12g. Likewise, a notch, not shown, having a predetermined shape different from that of the notch 20 is associated with a frame, not shown, which was exposed in a horizontal position but in the opposite top-bottom orientation to the frame 12f.

The position and shape of the notches, for example, the notch 20, is sensed by a film sensor 134 so that a particular orientation of an image in a frame such as the frame 12f is identified. Naturally, the identification of a frame orientation may be implemented by a number of notches, instead of the shape.

The lens deck 114 accommodates therein an image rotating mirror box 136 and, in this particular embodiment, two lens systems 138 and 140. As shown, an image rotating mirror box 136 is provided with three mirrors 144, 146 and 148 and driven by an image rotating motor 142 over an angular range of more than 270 degrees about the optical axis 120 relative to the deck 114. This allows an image in a frame of the film 124 to become incident to the camera head 106 in a position rotated within the range of at least 270 degrees.

In the illustrative embodiment, the lens systems 138 and 140 are selectively driven by a lens motor 150 into alignment with the optical axis 120 depending upon the size of the film 124a. For example, where the film 124a is of the 135 type, the lens system 138 will be selected and, where it is of the 110 type or the disc type, the lens system 140 will be selected.

The lens deck 114 is mounted on a housing of the apparatus in such a manner as to be moveable in a direction parallel to the optical axis 120. The moving of the lens deck 114 is effected by a lens deck motor 152 which may advantageously be implemented by a stepping motor.

The camera head 106 comprises a TV camera which picks up an image from a frame of the film 124a through the lens deck 114. The TV camera may advantageously be implemented using an imaging tube or a solid-state imaging device which delivers an R (red), G (green) and B (blue) or like color separation video signal to an output 151. The camera head 106, like the lens deck 114, is mounted on the housing of the apparatus to be moving in a direction parallel to the optical axis 120 and so driven by a camera head motor 154, which may also be implemented by a stepping motor. An optical shutter 116 located on the optical axis 120 and in front of the head 108 prevents intense light issuing from the light source 104 from constantly entering an image pickup section of the head 106.

The lens deck motor 152 motor 152 and camera head motor 154 are commonly driven by a motor control circuit 156. The motor control circuit 156 comprises stepping motor drive amplifiers and a pulse counter circuit and, as will be described, drives the motors 152 and 154 each by a desired number of pulses as instructed by a central processing unit (CPU) 160, thereby moving the deck 114 and the camera head 106 up and down. In FIG. 2, circuitry for sensing return positions of the head 106 and deck 114 and rotation angles of the motors 154 and 152 so as to feed them back to the motor driver 156 is not shown for simplicity.

The motor driver 156 and the various output units such as the shutter 116, a lens motor 150, an image rotation motor 142, pressing solenoid 130 and filter motors 126 and 118 are controlled by the CPU 160. The motor driver 156 is directly connected to a system bus 158 which in turn is connected to the CPU 160, while the various output devices are connected to the system bus 158 via drive amplifiers 162-172, respectively. In the event of movement of the orange mask filter 112 driven by the filter motor 126 or that of the ND filter 108 driven by the filter motor 118, the rotation angle of the motor and the position of the associated filter are sensed and fed back to a control system 180, although this circuitry is not shown for simplicity.

Figure 6:
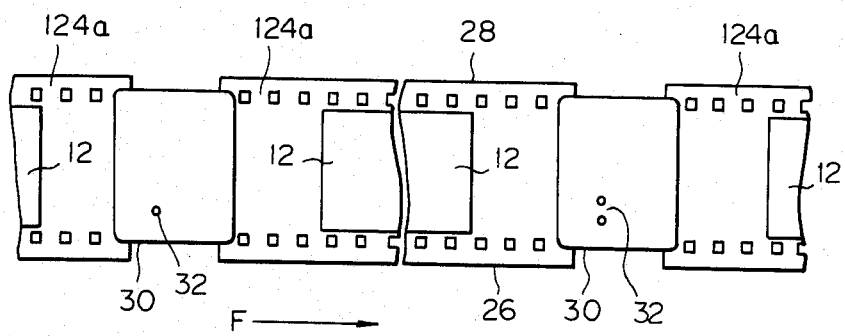

Now, as shown in FIG. 6, the film 124a supplied to the apparatus may even be made up of a plurality of lengths of film, each having a plurality of exposed frames 12 and interconnected with the others by tapes 30, to provide a long continuous roll. Such a film, in accordance with the preferred embodiment, is fed by a film motor 174 on the film carrier 122. The film motor 174 is connected to the bus 158 via a drive amplifier 176 to be controlled by the CPU 160.

As previously discussed, elongated films are available in JIS 135 type and 110 type. Each of the JIS 135 type and 110 type films is marketed as color and monochromatic films are marketed, and the color films as reversal type and negative type films. Further, the 135 type film may be selectively exposed in half-size and full-size. In this particular embodiment, as shown in FIG. 6, the kind and size of the film 124a are represented by a punched hole or holes 32 which are formed through the tapes 30. The holes 32, like the notches, such as the notch 22, are sensed by the sensor 134, the output of which is routed to the bus 158 via a read amplifier 178.

The brightness of the frame of the film 124a aligned with the optical axis 120 is sensed by the photometric element 132 whose output is applied to the bus 158 via a read amplifier 182.

The apparatus of the present invention is controlled by the control system 180 which includes the CPU 160. As shown, the control system 180 comprises a storage 184 for storing various data and programs, and input devices such as a keyboard 186 and a paper tape reader 188, for entering the operator's instructions and data. These are interconnected by the system bus 158. The paper tape reader 188 is an optional unit adapted to read a paper tape punched with color compensation data and other information beforehand, simultaneously with the feed of the film 124a. In an alternative embodiment, data indicative of the frame orientation of image-carrying material 124 may be punched on a paper tape 189, which is read by tape reader 188 in synchronism with the feeding of the image-carrying material 124. The data thus read is in turn stored in the storage 184 under the control of the CPU 160. In place of, or in addition to, the paper tape 189, other types of recording media, such as a magnetic tape, may advantageously be applicable to the system.

The video signal produced by the camera head 106 propagates over the output line 151 via a switch 190 to a video circuit system 200. The switch 190 serves to route the video signal to a color compensation circuit 192 either directly or by way of a negative-to-positive (NP) inversion circuit 194. The switch 190 is connected to the bus 158 via a drive amplifier 196.

The NP inversion circuit 194, when the film 124 on the carrier 122 is a negative, operates to invert the illumination level of the video signal so as to convert the negative picture to positive one. A function of the color compensation circuit 192 is to compensate for pictures in the frames of the film 124a, which possibly were shot under various exposures and/or illumination conditions different from standard ones, to gradations which are as close to standard ones as possible, thereby generating a video signal capable of reproducing an image that appears natural to the eyes or analogous in color to a particular cameraman's intention. The output of the circuit 192 is applied to a record circuit 198.

The record circuit 198 modulates the input video signal in frequency modulation (FM) or any other suitable modulation system, and applies the modulated signal to a magnetic head 208. The output of the record circuit 198 is also applied to a video monitor 212 such as a cathode ray tube (CRT).

In the illustrated apparatus, a magnetic disc 201 is detachably mounted on an output shaft 204 of a motor 202 so that the video signal applied from the record circuit 198 to the magnetic head 208 is selectively written into a plurality of tracks 206 of the disc 201. The motor 202 is powered by a power source 210 to rotate at a predetermined constant speed. The head 208 is supported by a transport mechanism which is driven by a drive amplifier 214, as schematically indicated by a dotted arrow 211, thereby being movable in the radial direction of the disc 200 as instructed by the CPU 160. This allows the head 208 to select any of the tracks 206 for recording the video signal therein. A position of the head 208 is detected in terms of a rotation angle of its associated motor and a return position of the head and, then, fed back to the control system 180, although circuitry therefor is not shown in FIG. 2 for simplicity.

Figure 3:
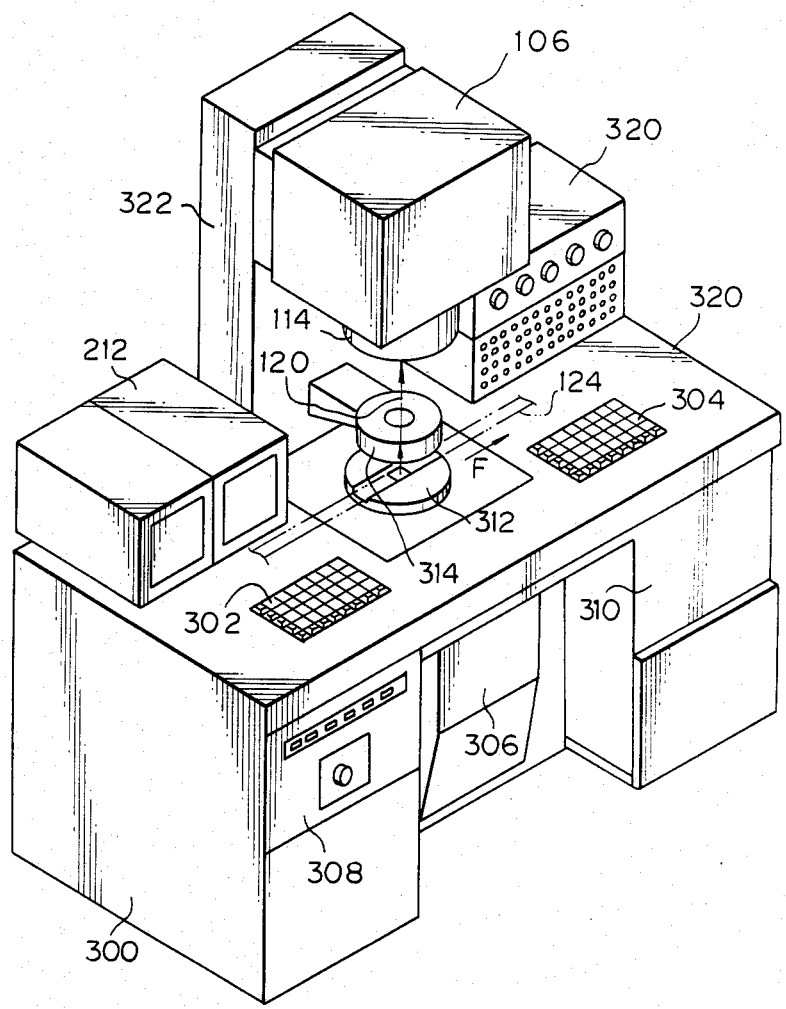
FIG. 3 is a perspective external view of the apparatus in accordance with the present invention.

The apparatus of the present invention may be provided with such an appearance as one shown in FIG. 3 by way of example. The apparatus comprises a desk-like housing 300. Arranged on the top 320 of the housing 300 are a keyboard 302 for entering color compensation instructions, a keyboard 304 for entering the kinds and sizes of films, orientations of frames as well as record instructions and the like, a monitor device 212, etc. The keyboards 302 and 304 in combination constitute the keyboard 186 shown in FIG. 2.

When the optical system 100 is loaded with the film or print 124 which carries no data, in the form of notches 20 and 22 as shown in FIG. 5, on vertical-horizontal orientation, top-bottom orientation, optical density, color correction and the like of a picture recorded thereon, the keyboards constituting keyboard 186 may be used for entering such data by the user who watches the picture shown on the monitor display 212, rather than by means of punched tape 189 or notches 20 and 22.

A recording material mount section 312 inclusive of the film carrier 122, pressing elements 128 and sensor 134 is rotatable about the optical axis 120 relative to the housing top 320. As indicated by dash-and-dots line in FIG. 3, the film 124a played out from a reel or the like is fed over the mount section 312 by the film motor 174. Here, the direction indicated by an arrow F be the forward direction.

A lower section 306 of the housing 300 accommodates the optical system 100 inclusive of the light source 104 and light integrator 110 and its associated elements, while another lower portion 308 accommodates electronic circuitries inclusive of the control system 180. Still another lower portion 310 accommodates a recording arrangement inclusive of a deck for the magnetic disc 201.

A photometric section 314 accommodating the photo-metric element 132 therein is disposed above the mount section 312. Disposed above the section 314 is the lens deck 114 and the camera head 106 which are supported by a column 322 to be movable up and down independently of each other. A second housing 320 is mounted on the desk top 320 and houses the video circuit system 200 therein.

Figure 4:
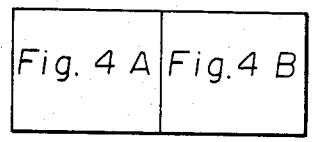
FIGS. 4A and 4B, when combined as shown in FIG. 4, are a functional block diagram of a control system and its associated elements included in the apparatus of FIG. 2.
Figure 7:
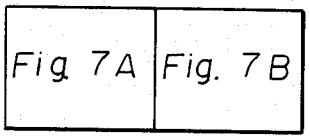
FIGS. 7A, 7B, 8A, 8B and 9A, 9B, when combined as shown in FIGS. 7, 8 and 9, respectively, are partially schematic block diagrams showing alternative embodiments of the invention.
Figure 8:
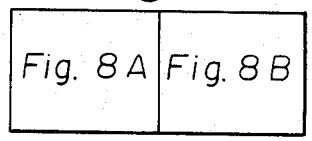
Figure 4A:
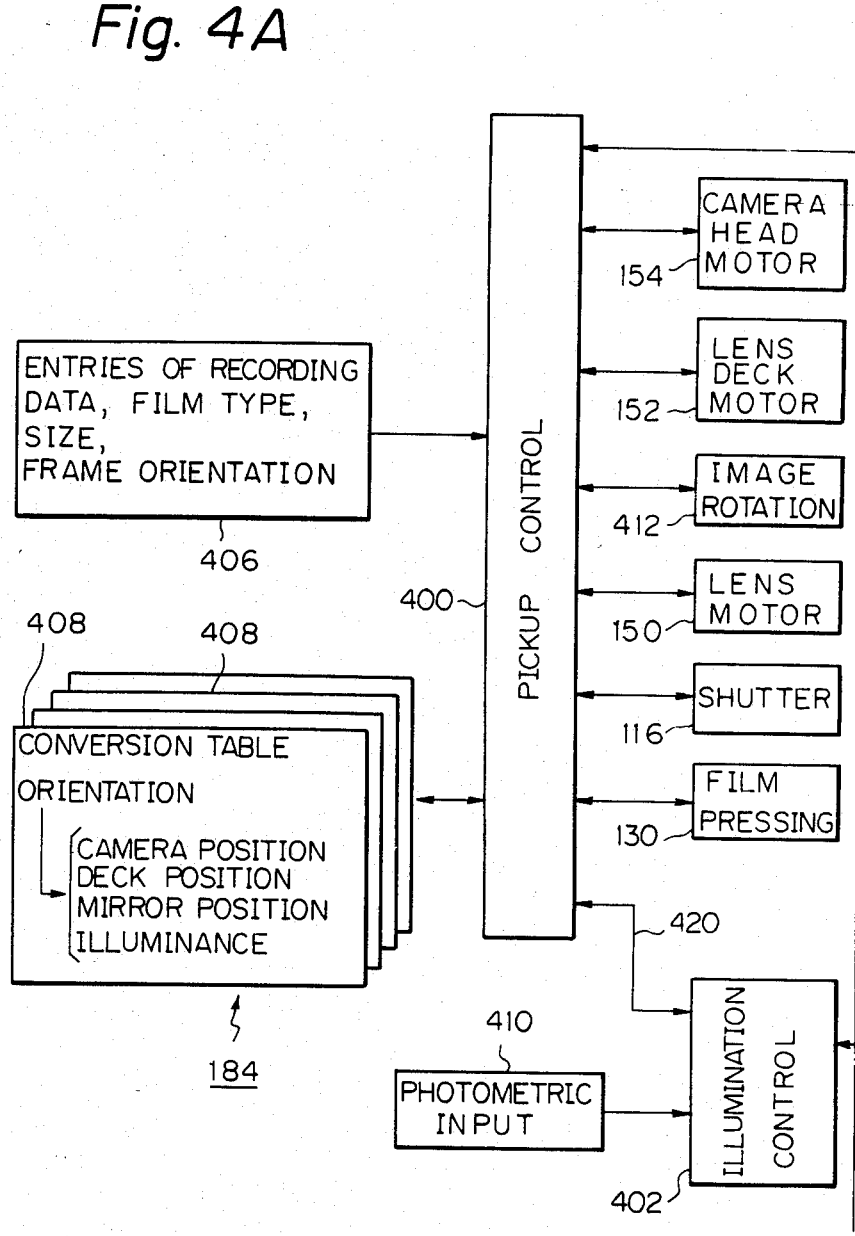
Figure 4B:
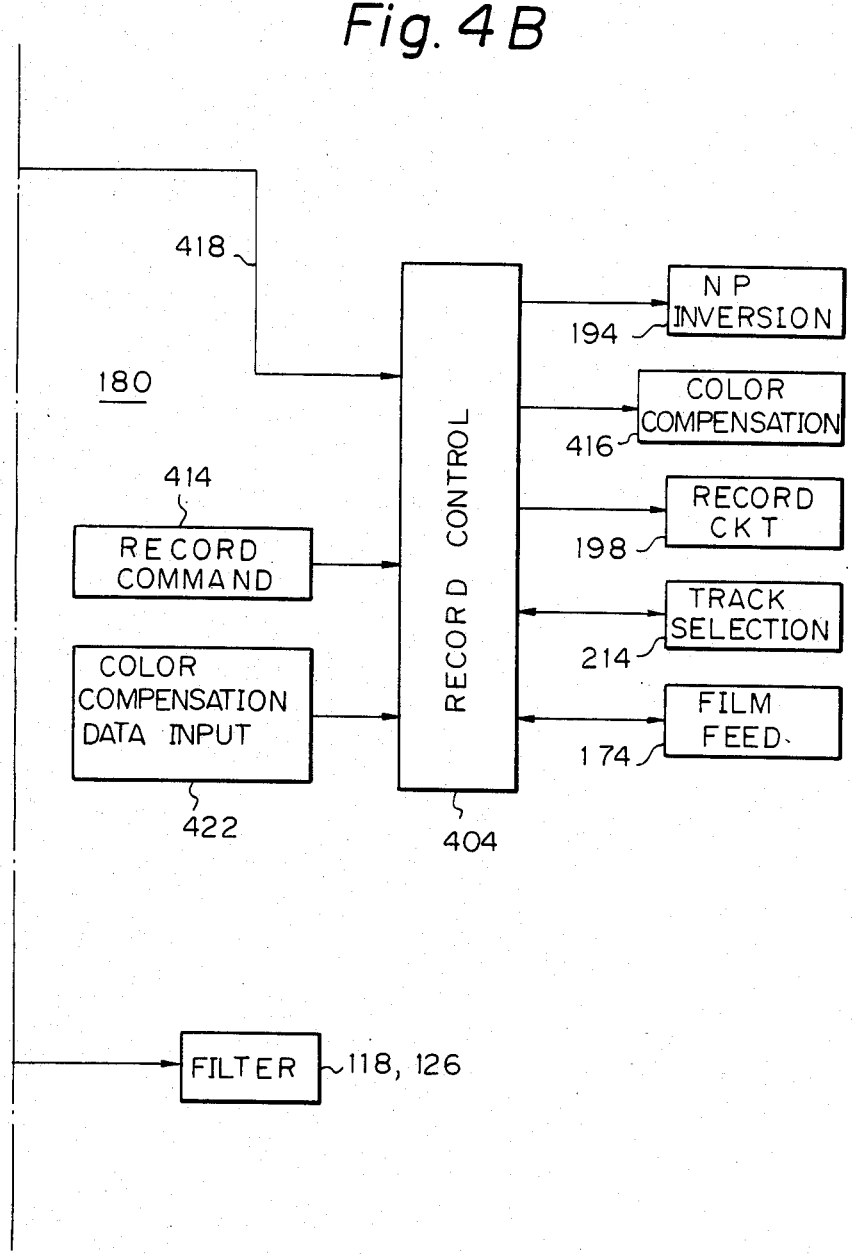

The operation of the apparatus in accordance with the present invention will be described with reference to FIGS. 4A and 4B, which are a schematic functional block diagram of the control system 180 and its associated elements. The drawing mainly shows the functions of the control system 180 and designate those blocks which clearly correspond to the structural elements of FIG. 2 by the same reference numerals.

When the film 124a is laid on the film carrier 122 of the mount section 312, an image pickup control 400 in the CPU 160 senses the punched hole or holes 32 of the connecting tape 30 using the sensor 134 to determine a kind and size of the film 124a. The operator manipulates the keyboard 186 to input the position of a frame of the film 124 to be recorded in the disc 201, selection data associated with the tracks 206, and other data according to requirements (406).

Then, as the operator enters an instruction for opening the shutter 116 via the keyboard 186, the image pickup control 400 opens the shutter 116 to display a picture recorded in the specific frame on the video monitor 212. The operator is now allowed to operate the keyboard 186 while watching the monitor 212 in order to specify a particular frame which should be stored in the disc 201. Before such operator's manipulation, the image pickup control 400 moves the camera head 106 and lens deck 114 so that a picture in a frame will be picked up in a correct state.

A record control 404 performs film feed 174 based on the input data until the desired specific frame is brought to the image pickup station. At this instant, the image pickup control 400 reads the notches 20 and the like formed at the edges 26 and 28 of the film 124a by means of the sensor 134, thereby identifying an orientation of a frame 12 located on the optical axis 120 (406). Further, the record control 404 drives the head transport mechanism 211 to select empty ones of the tracks 206 for recording a video signal (214).

The storage 184 stores a conversion table 408 for the selection of the lens system 138 or 140 which depends upon the kind and size of the film 124a, and that of a distance or relative position between the camera head 106 and the lens deck 114 in the direction of the optical axis 120 in correspondence with the frame orientation and with a predetermined image pickup position of the film 124a on the film carrier 122 employed as a reference, or magnification previously discussed. FIG. 4A schematically shows the condition wherein conversion tables 408 are assigned in one-to-one correspondence to the kinds and the sizes of films 124a and stored in the storage 184.

For example, in the case of a JIS 135 type full-size film, predetermined data are stored employing the positions of the lens deck 114 and camera head 106 associated with the horizontal frame 12a shown in FIG. 1A as a standard; for the vertical frame 12c, positions of the lens deck 114 and camera head 106 which set up a magnification which is 0.74 times the magnification of the horizontal frame 12a are stored as the conversion table 408.

Concerning a JIS 135 type half-size film, assume that the positions of the lens deck 114 and camera head 106 associated with the horizontal frame 12a shown in FIG. 1A is the standard. Then, the whole horizontal frame will be picked up in the effective picture area 10 if the lens deck 114 and the camera head 106 are positioned to provide a magnification which is about 1.51 times the standard; a vertical frame will be picked up in a condition similar to that of FIG. 1C if they are positioned to provide a magnification which is about 1.14 times the standard. This data is stored in the conversion table 408.

Likewise, for a 110 type film, the lens deck 114 and camera head 106 will be positioned such that a horizontal frame shown in FIG. 1A is picked up in a size about 2.09 times the standard position data and a vertical frame, in a size about 1.6 times the same, so that an image in the frame is picked up in a state similar to that of FIG. 1C. This data is stored in the conversion table 408.

Further, as for the disc film, if the lens deck 114 and camera head 106 are positioned such that a horizontal frame shown in FIG. 1A is picked up in a size about 3.34 times the above-mentioned standard position data and a vertical frame, in a size about 2.57 times, they will be picked up in a condition similar to that of FIG. 1C and the data will be stored in the conversion table 408.

Naturally, the data described above is only illustrative and does not limit the present invention. That is, any other kind of data may be used to allow frames to be picked up in the condition of FIG. 1B or one indicated by the dash-and-dot line 12e in FIG. 1C or in any of their intermediate conditions. For example, three different conversion tables 408 may be assigned respectively to three different proportions of the area of the omitted portion 16 to the total area of the frame 12, i.e. 0%, 20% and 33%, and selectively used through the keyboard 186. One possible scheme is such that the apparatus is automatically conditioned for the 0% omission and the operator, observing the monitor 212, decides important part of the information appearing thereon so as to select a magnification which may result in substantial omission.

The conversion table 408 further stores therein data indicative of standard illuminations which repsectively are associated with magnifications of the frames of the film 124a. This kind of data is directed to illuminating the film 124a with an illumination matching the lattitude of the camera head 106 for each of the magnifications with respect to a frame which was exposed under a standard shooting condition (adequate exposure), in view of the fact that a change in magnification entails a substantial change in the illumination of the frame surface of the film 124a which is illuminated by the light source 104 as previously described. Any difference in illumination due to deviation from a standard condition is further compensated for in response to the illumination sensed by the photometric element 132. These compensations are accomplished by moving the ND filter 108 into and out of the optical axis 120.

The image pickup control 400, referencing the conversion table 408 in the storage 184, searches for data associated with the positions of the camera head 106 and the lens deck 114, selection of the lens system 138 or 140, orientation of the mirror box 136, and whether the filter 112 and/or NP inversion 194 is necessary, based on the kind and size of the film and the orientation of the frame which are entered with respect to the frame of the film 124a aligned with the optical axis 120.

In response to the searched data, the image pickup control 400 drives the camera head motor 154, the lens deck motor 152 and the lens motor 150 to set up a specified magnification. This causes the lens system 138 or 140 to vary the magnification and focus so that the image is picked up in a correct top-bottom orientation and magnification, whatever the kind and size of the film or the frame orientation may be. Where the film 124a is of the negative type, an illumination control 402 drives the filter motor 126 to insert the orange mask compensation filter 126 while the record control 404 actuates the switch 190 to connect the NP inversion circuit 194 to the output line 151 of the camera head 106.

Another function of the image pickup control 400 is to control the image rotation 412. In this particular embodiment, the image rotation 412 is accomplished by rotating the mirror box 136 and, thereby, the light image incident on the head 106. Alternatively, image rotation may be implemented by rotating the camera head 106, or by temporarily storing a video signal in a storage before supplying it to the record circuit 198 and then rotating the stored video signal.

Figure 7A:
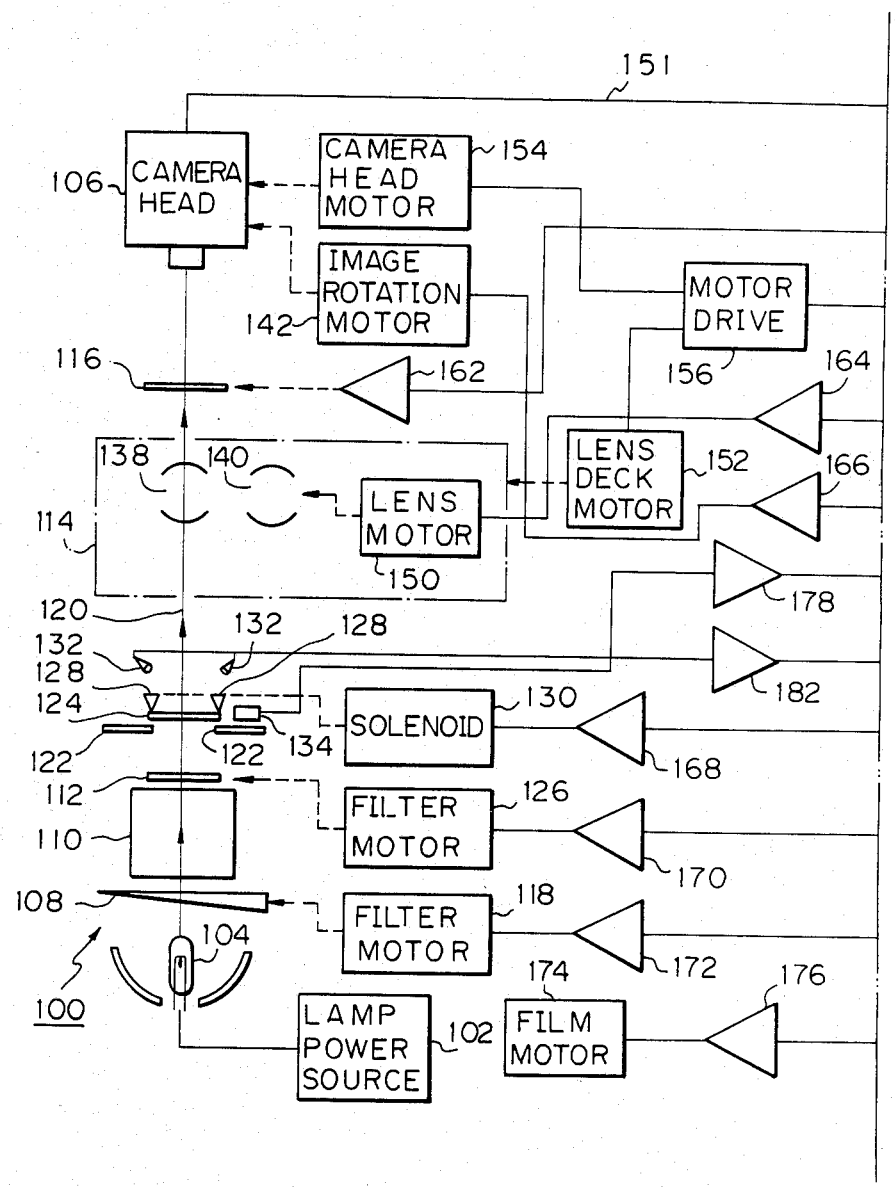
Figure 7B:
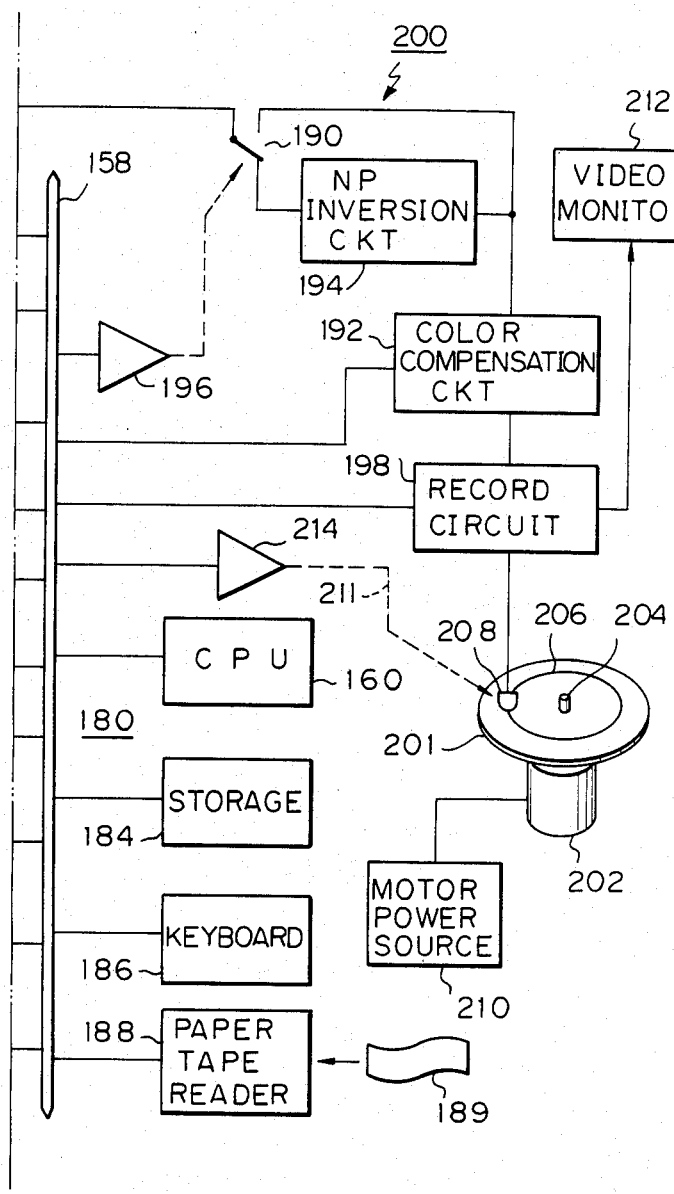

FIGS. 7A and 7B show an alternative embodiment in which image rotation is implemented by rotating camera head 106. In this embodiment, image rotation motor 142 is adapted to drive the camera head 106 so that it will rotate in accordance with the frame orientation sensed by the system. The lens deck 114, therefore, does not have the mirror box 136 as included in the embodiment shown in FIGS. 2A and 2B. In the figures, the same reference numerals, as in FIG. 1 denote the similar constituent elements to those of FIGS. 2A and 2B.

Figure 8A:
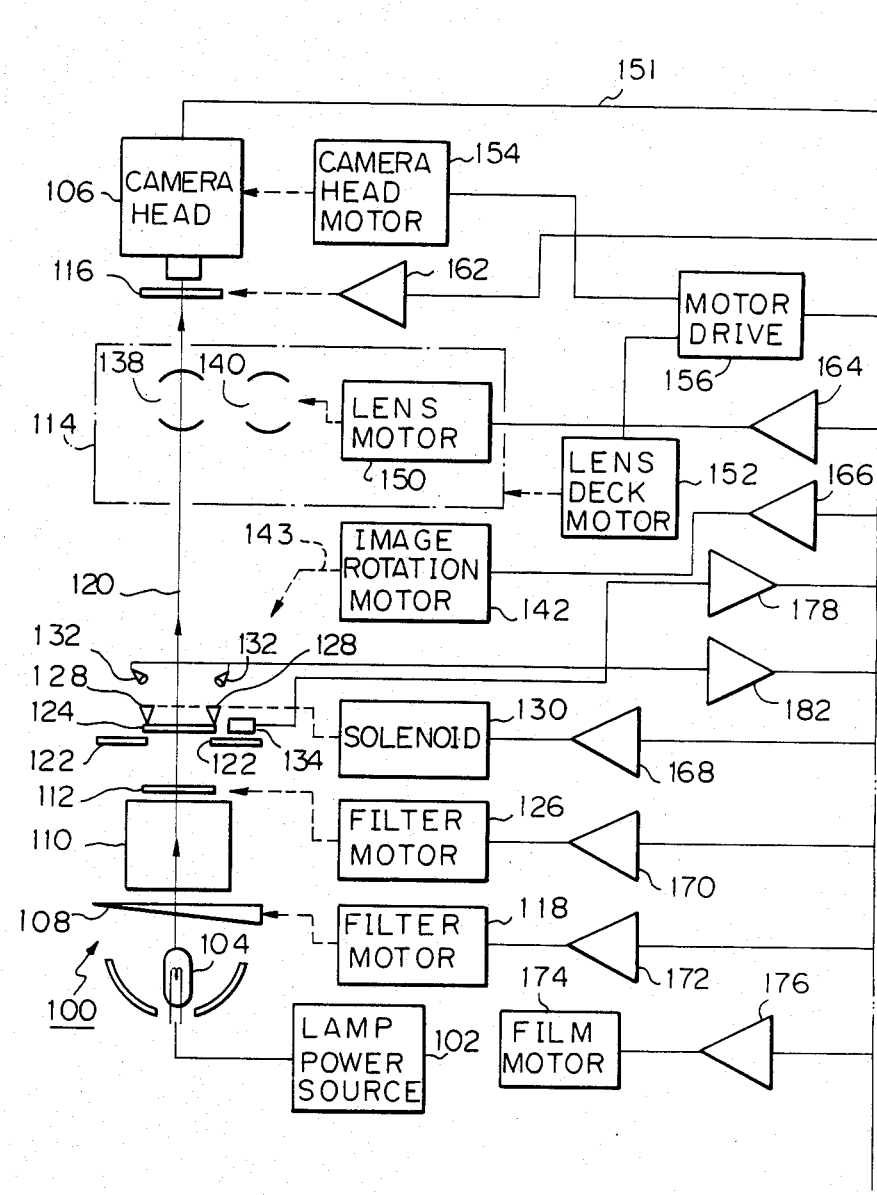
Figure 8B:
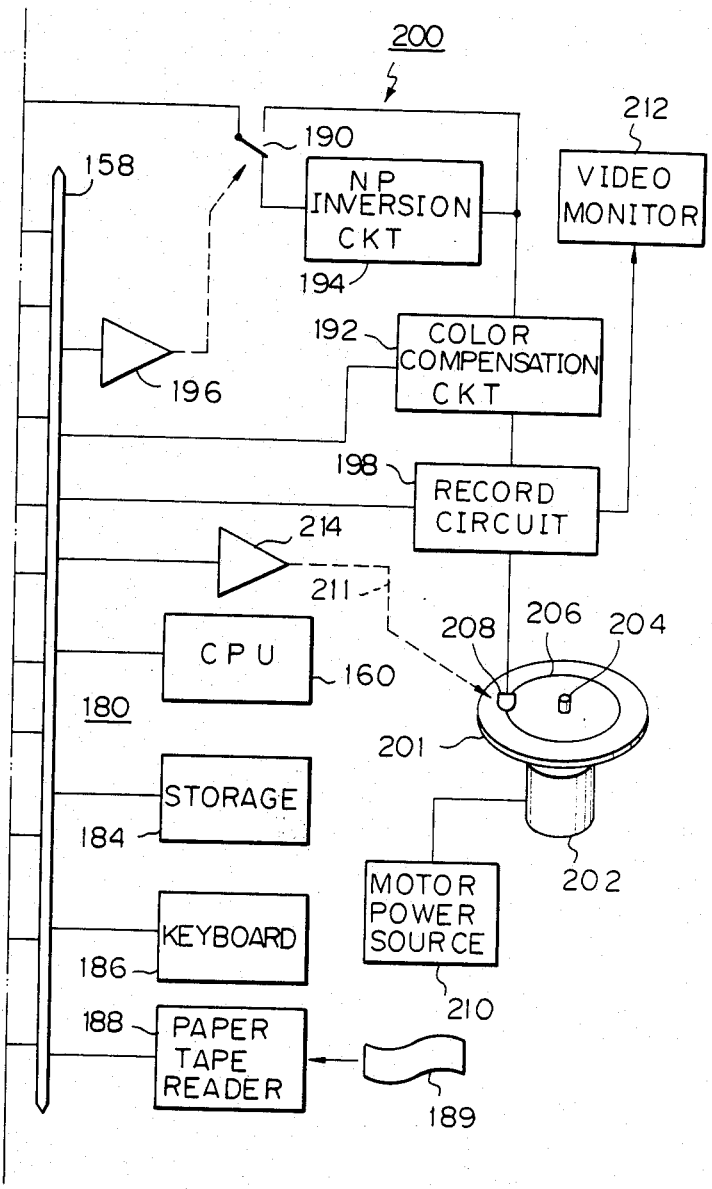

FIGS. 8A and 8B show another alternative embodiment in which image rotation is effected by rotating the recording material mount section 312 which supports the carrier 122. The mount section 312 is rotatably supported on housing 300, and is mechanically linked with the image rotation motor 142 as symbolically depicted by a dotted line 143 in FIGS. 8A and 8B. The lens deck 114, therefore, does not include the mirror box 136, as included in the embodiment shown in FIGS. 2A and 2B. The mount section 312 is rotated by the image rotation motor 142, when energized, in accordance with the frame orientation data entered into the system.

Figure 9:
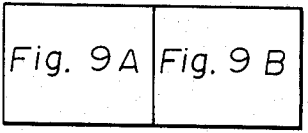
Figure 9A:
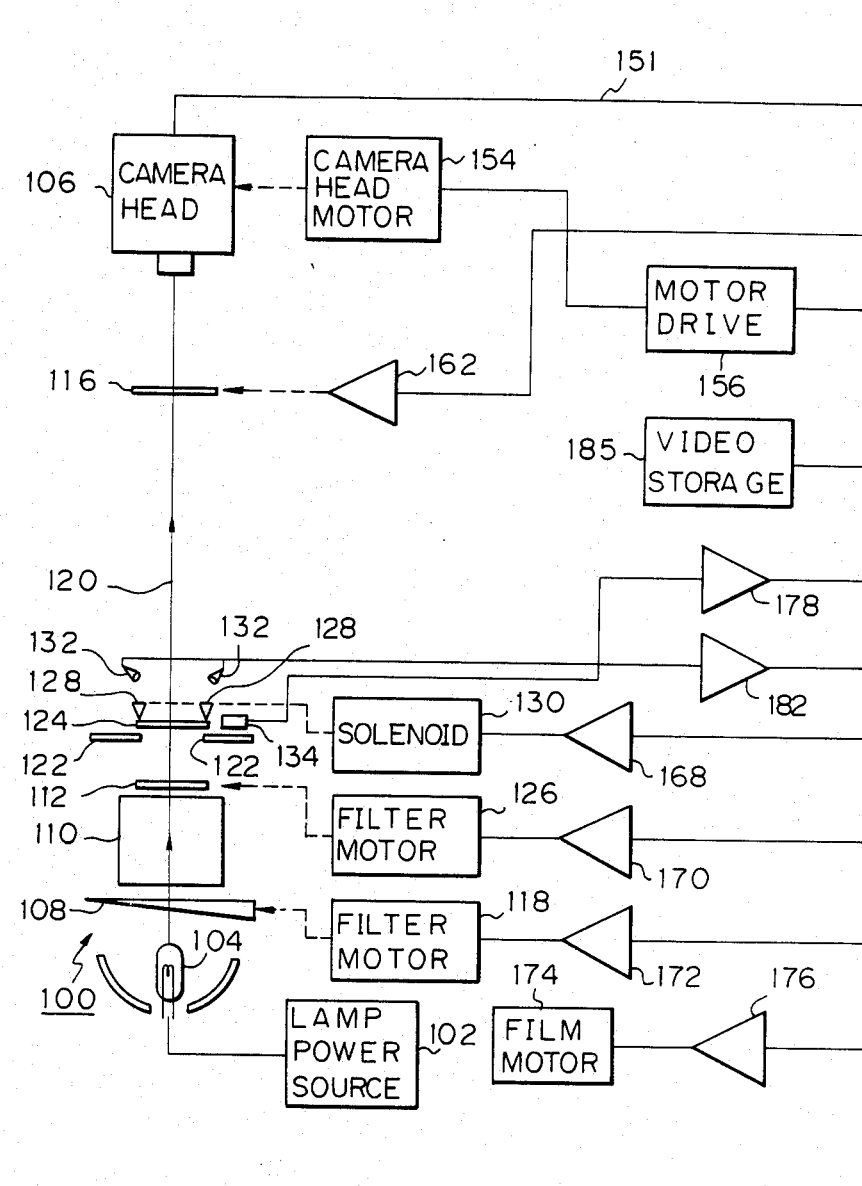
Figure 9B:
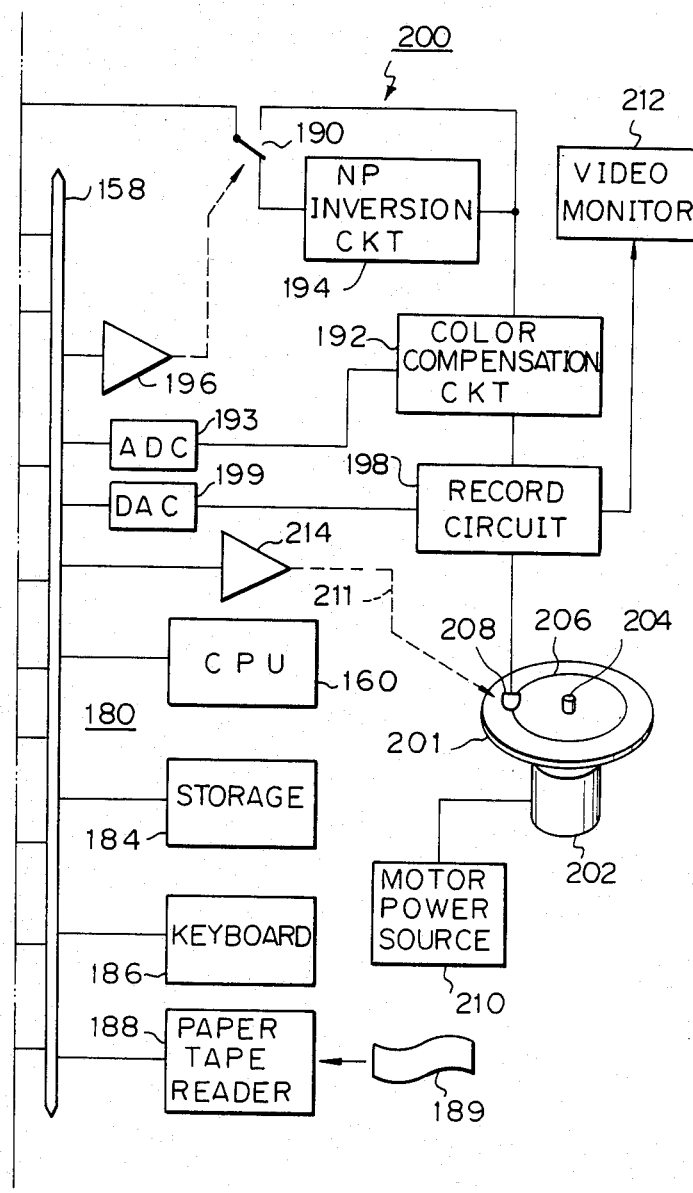

FIGS. 9A and 9B show still another embodiment which includes a video storage 185 interconnected with the system bus 158. The video storage 185 is adapted to store video signals produced from the camera head 106 in the form of digital data. The video signal produced by the camera head 106 is transmitted over line 151 via the color compensation circuit 192 to an analog-to-digital conversion (ADC) circuit. The video signal is converted into corresponding digital data by the analog-to-digital converter 193 to be stored in the video storage 185 under the control of CPU 160. The CPU 160 performs image rotation and/or variable magnification of the image in the video data stored in the storage 185 in accordance with the data entered representative of the frame orientation, the size and the type of the recording material 124. The resultant data, thus converted in frame orientation and/or magnification, is then read out from storage 185 and converted into corresponding analog signals through the digital-to-analog converter (DAC) 199 to the be transmitted to record circuit 198 for recording on disk 201. The FIG. 9 embodiment does not include the lens deck 114, the image rotation motor 142 and the amplifier 164 as involved in the embodiments shown and described before.

Now returning to FIGS. 2A and 2B, and 4, the illumination control 402 measures an illumination on the frame surface of the recording material 124 by means of the photometric element 132 (410) substantially in parallel with the image rotation described above. Then, the illumination control 402 references the data associated with the magnification provided by the image pickup control 400 together with the photometric data to determine the position of the ND filter 108 relative to the optical axis 120, whereafter the film motor 118 is driven based on the so determined position of the filter 108, i.e. the degree of insertion into the optical axis 120.

After the camera head 106 has correctly picked up the frame of the recording material 124 in the above described manner, the operator manipulates the keyboard 186 to enter color compensation data (422) while watching the video monitor 212. The color compensation data may, for example, be the data associated with the deviation from the standard condition. In response to the color compensation data, the record control 404 sets a condition for color compensation. In the illustrative embodiment, color compensation is effected by the color compensation circuit 192 which adjusts the level of each color separation signal according to the condition decided by the circuit 192. By recording a video signal which has undergone such color compensation in the disc 201, it is possible to reproduce from the disc 201 a picture having colors which appear substantially natural or analogous to those intended by the cameraman.

The apparatus is now ready to pick up the image from the selected frame of the recording material 124. As the operator manipulates a record command key on the keyboard 186, the record control 404 drives the record circuit 198 for one-field period to record the video signal in one of the empty tracks 206 of the disc 201. Upon completion of the recording, the same procedure may be repeated to record an image in the next frame of the recording material 124.

Various changes and modifications will become possible for those skilled in the art after receiving the teachings of the present disclosure without departing from the scope thereof. For example, the present invention is applicable not only to photographic images stored in negative or positive films but also to those which are recorded in prints. In that case, the illumination system will be modified for reflection type illumination instead of the transmission type shown and described. Also, a so-called print album which has numerous prints carried by an elongated holder is advantageously usable with the present invention.

In the preferred embodiment, the kind and size of the film and the orientation of the frame are represented by the punched hole in the tape 30 between films 124*a* and the notch at the film edge 26 or 28. Another possible approach is recording data associated with respective frames in a paper tape or a like separate recording medium so that the data may be read simultaneously with or independently of the feed of the frames. It will be apparent that all the operations may be effected by hand while displaying each frame on the monitor 212.

In the illustrative embodiment, data associated with frame orientations are contained in the notches each originally being adapted to indicate a center of a frame 12. If desired, however, exclusive notches may be utilized for the indication of frame orientations. Then, when a plurality of consecutive frames appear in an identical orientation, only the leading one of them may be provided with a notch indicative of the particular orientation with the rest of them considered to have the same orientation. Such will be advantageous in preserving the mechanical strength of the film.

Color compensation data, too, may be recorded beforehand in the film 124*a* itself or in such an independent recording medium as a paper tape frame by frame, instead of being entered through the keyboard 186.

The magnification for any particular kind and size of a photographic image and frame orientation has been implemented by an optical system including the lens systems 138 and 140. Alternatively, it may be implemented by another kind of optical system for magnification such as a zoom lens or even by processing a signal stored in a storage adapted to temporarily store video signals.

In the embodiment shown and described, the video signals produced in the manner described are recorded in the magnetic disc 201. This does not limit the present invention, however. If a picture in a frame is picked up in a magnification and a top-bottom orientation which conform to a particular orientation of the frame and is developed in the form of a video signal with color compensation and other processings optionally applied, it can eventually be reproduced by a video monitor in an adequate condition, whether it be stored in a recording medium or not.

In summary, it will be seen that the present invention is capable of desirably reproducing an image in a frame on a video monitor whether it be read out of a recording medium or not, because the image is picked up in a magnification and a top-bottom orientation conforming to a frame orientation and because it is produced in the form of video signal with color compensation and other processings effected as desired.

What is claimed is:

1. A method of producing video signals representative of photographic images which are stored in a plurality of substantially equally dimensioned frames in horizontal and vertical positions by picking up the photographic images, comprising the steps of:
   providing a first signal indicative of the horizontal and vertical positions, and a top-bottom orientation of the photographic images stored in the frames;
   rotating the photographic images relatively in response to the first signal; and
   producing, for a vertically positioned image, a video signal representative of the photographic image with a magnification which is smaller than that of a horizontally positioned image, whereby a video signal is provided which represents a photographic image of a non-inverted top-bottom orientation without essential portions of the photographic image being omitted.

2. A method in accordance with claim 1, wherein the photographic image is rotatable substantially over an angular range of 270 degrees.

3. A method in accordance with claim 1, wherein the photographic image is stored in a film.

4. A method in accordance with claim 1, wherein the photographic image is stored in a print.

5. A method in accordance with claim 3, wherein the first signal is provided in response to an indication indicative of the vertical and horizontal positions, and the top-bottom orientation of the photographic image which is indicated on the film.

6. A method in accordance with claim 1, wherein the first signal is provided in response to data which is recorded in a recording medium independent of the film in correspondence with the respective frames.

7. A method in accordance with claim 1, wherein the first signal is provided in response to data which is provided in association with a photographic image appearing on a video display.

8. A method in accordance with claim 1, wherein the relative rotation of the photographic image is caused by optically rotating the photographic image to be picked up.

9. A method in accordance with claim 1, wherein the relative rotation of the photographic image is caused by rotating one of an imaging device for picking up a photographic image or the photographic image, relative to the other.

10. A method in accordance with claim 1, wherein the relative rotation of the photographic image is caused by processing the video signal representative of a photographic image so as to rotate the photographic image.

11. A method in accordance with claim 1, wherein conversion of a magnification of a photographic image is caused by varying a magnification with which the photographic image is to be picked up.

12. A method in accordance with claim 1, wherein conversion of a magnification of the photographic image is caused by processing the video signal representative of the photographic image so as to vary the magnification.

13. A method in accordance with claim 3, wherein the film is and the negative a video signal representative of the photographic image is converted to a video signal indicative of a corresponding positive image to be produced.

14. A method in accordance with claim 1, wherein the video signal representative of the photographic image is produced with color compensation effected thereon.

15. A method in accordance with claim 1, wherein the video signal representative of the photographic image is stored in a recording medium.

16. An apparatus for producing a video signal representative of a photographic image comprising:
    image pickup means for picking up photographic images which are stored in a plurality of substantially equally dimensioned frames in horizontal and vertical positions to form video signals representative of the photographic images;
    output means for producing the video signals;
    input means for receiving a first signal indictive of the vertical and horizontal positions, and a top-bottom orientation of the photographic images stored in the frames;
    image rotating means for rotating the photographic images relatively in response to the first signal; and
    magnification varying means for producing, for a vertically positioned image, a video signal representative of the photographic image with a magnification which is smaller than that of a horizontally positioned image, whereby a video signal is provided which represents the photographic image in a non-inverted top-bottom orientation without essential portions of the photographic image being omitted.

17. An apparatus in accordance with claim 16, wherein the photographic image is stored in a film, the input means sensing an indication indicative of the vertical and horizontal positions, and the top-bottom orientation of the photographic image which is indicated on the film.

18. An apparatus in accordance with claim 16, wherein the photographic image is stored in a film, the input means reading data which is stored in a recording medium independent of the film in correspondence with the respective frames of the film.

19. An apparatus in accordance with claim 16, wherein the photographic image is stored in a film, the input means comprising a keyboard for entering data in association with a photographic image appearing on a video display.

20. An apparatus in accordance with claim 16, wherein the image rotating means optically rotates the photographic image to be picked up.

21. An apparatus in accordance with claim 16, wherein the image rotating means rotates one of the image pickup means or the photographic image to be picked up, relative to the other.

22. An apparatus in accordance with claim 16, wherein the magnification varying means varies a magnification with which the image pickup means is to pick up the photographic image in response to the vertical and horizontal positions which are included in the received first signal.

23. An apparatus in accordance with claim 16, wherein the photographic image is stored in a film, the output means, when the film is a negative, producing a video signal representative of the photographic image with a negative-to-positive conversion effected thereon.

24. An apparatus in accordance with claim 16, wherein the output means comprises color compensation means for applying color compensation to the video signal.

25. An apparatus in accordance with claim 16, wherein the output means comprises recording means for recording the video signal in a recording medium.

26. An apparatus in accordance with claim 16, wherein the input means includes additional input means for receiving a size of a frame in which a photographic image is stored, the magnification varying means varying a magnification in response to the received size of a frame.

* * * * *